United States Patent [19]

Nilsson

[11] Patent Number: 4,715,032
[45] Date of Patent: Dec. 22, 1987

[54] METHOD AND APPARATUS FOR THE CONNECTION OF A CLOSED RING THROUGH A TELEPHONE EXCHANGE

[75] Inventor: Olof E. Nilsson, Rönninge, Sweden

[73] Assignee: Telefonaktiebolaget LM Ericsson, Stockholm, Sweden

[21] Appl. No.: 692,029

[22] PCT Filed: Jun. 8, 1984

[86] PCT No.: PCT/SE84/00220

§ 371 Date: Jan. 16, 1985

§ 102(e) Date: Jan. 16, 1985

[87] PCT Pub. No.: WO84/05009

PCT Pub. Date: Dec. 20, 1984

[30] Foreign Application Priority Data

Jun. 9, 1983 [SE] Sweden ................................ 8303284

[51] Int. Cl.⁴ ............................ H04J 3/00; H08Q 3/00
[52] U.S. Cl. ................................... 370/86; 340/825.05
[58] Field of Search ........................... 370/86, 89, 90; 340/825.05, 825.06, 825.07

[56] References Cited

U.S. PATENT DOCUMENTS

| | | | |
|---|---|---|---|
| 3,879,710 | 4/1975 | Maxemchuk | 370/89 |
| 4,154,983 | 5/1979 | Pedersen | 370/89 |
| 4,237,553 | 12/1980 | Larsen | 370/89 |
| 4,393,497 | 7/1983 | Cantwell, Jr. | 370/89 |
| 4,489,379 | 12/1984 | Lanier et al. | 370/89 |

OTHER PUBLICATIONS

IBM Technical Disclosure Bulletin, vol. 15, No. 1, Jun. 1972, pp. 337–339, L. P. West: "Highly Available Loop Carrier System".

Primary Examiner—Jin F. Ng
Assistant Examiner—Frank M. Scutch, III
Attorney, Agent, or Firm—Roberts, Spiecens & Cohen

[57] ABSTRACT

A method and apparatus which relate to a digital telecommunication system in which information is transferred between terminals (T1–Tn) connected to a telephone exchange for establishing a ring with the aid of a loop connection to enable sending data between arbitrarily selected terminals. Each of the terminals includes at least one send channel and one receive channel.

Such a telecommunication system includes a plurality of terminals connected via time multiplexed channels to an exchange of the stored program control type (SPC), in which the switching functions are controlled by software. The terminals may have telephone sets, display units, etc. Control units and separate computers can also be connected to the exchange. A transfer with the aid of the exchange is made, from an arbitrary terminal to the next terminal in a serial loop or ring irrespective of between which terminals connection is desired. The information to be sent from one terminal to another thus goes via all terminals connected to the loop. The loop is set up with the aid of the exchange in such a way that the send output (S) of a preceding terminal is connected to the receive input (R) of the next terminal, etc. such that a closed ring is obtained, enabling a terminal anywhere within a PABX to be connected to another optional unit.

5 Claims, 3 Drawing Figures

METHOD AND APPARATUS FOR THE CONNECTION OF A CLOSED RING THROUGH A TELEPHONE EXCHANGE

FIELD OF INVENTION

The invention relates to a method and apparatus in a digital telecommunication system in which information is transferred between terminals connected to a telephone exchange, for establishing a ring with the aid of loop connection to enable the transmission of data between arbitrarily selected terminals, each of such terminals including at least one send channel and at least one receive channel.

BACKGROUND

In the current state of the art, separate networks are employed for data terminals which are parallel to networks for voice communication. Typically, display screens and control units are connected by a network of coaxial cables. The control units are connected directly, or via modems and analogue telephone lines, to a network node or a front-end computer. There is a separate network for voice communication parallel to these networks, which in some cases consist of several parallel networks for different computer systems.

New types of networks have been proposed for speech and data to provide integrated communication, above all in large office environments. Examples of these are high speed networks (local area networks or LAN) proposed by suppliers of data and office automation equipment, and new types of telephone exchanges (PABX) have been proposed for digital switching and transmission by suppliers of telephone equipment.

The LAN solutions are mainly directed to data traffic with "all-to-all communication" without physical switching. The PABX solutions are characterized by being circuit switched to give the opportunity for coupling the connected apparatus together in pairs. The apparatus can relate either to telephones or data equipment. In modern PABX's data and speech can be transferred simultaneously and mutually independently through the same cabling. In certain cases, a PABX may also be made arranged as a physically distributed system kept together by multiplexed high-speed connections, providing communication ability over large geographic areas in the same way as within a building.

Examples are given below of some of the problems existing in the data communication field, above all with large terminal densities.

From the administrative aspect it is impractical, in the state of the art, to utilize two or more parallel communication networks with completely different administrative routines ("catalogue services" etc). This is the case with today's systems (coaxial networks) as well as in the LAN solutions discussed. The circuit-switched PABX solutions proposed to date can partially solve these problems, but with higher cost and with less flexibility than in the solution provided in accordance with the invention.

In an environment where the terminal system is rapidly changed by additions and removals, the administrative routines often constitute a restraining factor with regard to development. In the present state of the art, the terminals are tied together with a permanent coaxial network to a control unit. When a terminal is moved, new cabling must be run and documented, and the host computer to which the terminal is to be connected must have its program altered (network generation). With larger terminal networks, the latter requires a very large data programming force, which is costly as well as being so demanding that it can only be carried out infrequently. In turn, this results in long delays when there are alterations, i.e. installed terminals cannot be used.

The possibilities of improved availability are also exemplified by the case where many (typically about 30) terminals are connected to one control unit.

Should there be a fault in the control unit, its line or modem, all the terminals lose contact with the host computer.

Faults' locations may be determined either by physically moving the modem cable on the host computer side to a testing center, by different test procedures from the host computer or by local fault locating at the control unit.

In modern solutions (pertaining to coaxial networks, etc.) there is a fixed connection between control units and terminals, and also generally between the control unit and the computer. This means that in workplaces where access to several computer systems is required, several terminals must be connected to different control units. This also applies if the terminal systems are programmable for enabling connection to different computer systems, since all terminals related to a control unit must change function simultaneously.

SUMMARY OF INVENTION

It is an object of the invention to provide improved methods and apparatus for the transmission of data between terminals, particularly in digital Telecommunication Systems.

In accordance with the invention, new connection paths are disposed in a PABX in a way not previously used. A telecommunication system of the kind mentioned can, for example, contain a plurality of terminals connected via time multiplexed channels to an exchange of the stored program control (SPC) type, in which the connection functions are controlled by software. The terminals may be telephone sets, display units etc. Control units and separate computers can also be connected to the exchange. In the known art, connection paths are always set up in pairs through the exchange, i.e. transmitter and receiver arrangements between two subscribers are always connected directly to each other. In accordance with the invention, a transfer with the aid of the exchange is made instead, from an arbitrary terminal to the next terminal in a serial loop (or ring), irrespective of between which terminals communication is desired. The information from one terminal to another thus goes via all terminals connected to the loop. The loop is set up through the exchange in a manner such that a closed ring is obtained, thus enabling a terminal anywhere within a PABX to be connected simply and economically to another optionally selected unit, which results in that the software in the host computer does not need to be altered. This also applies if the PABX solution is distributed over a larger geographical area.

With the aid of the all-to-all communication afforded by the loop solution, reserve control units can be configured into each loop, and activated if there is a fault in an ordinary unit. When there are several control units in a loop, a common unit can be a standing reserve for all of them. Furthermore, by utilizing the switching ability in a PABX, centrally located units can be kept in reserve for several loops. This also applies to distributed systems.

One of the advantages with the method and apparatus provided in accordance with the invention is that in a ring or loop solution, the terminals can individually change programs and control units, enabling that only one terminal per work station is required even if there is the demand for availability to different computer systems. This opportunity of "simultaneous" communication is of even greater importance when the terminals are provided with a "split screen" facility in which different parts of a display screen are in communication with different computers (and/or other terminals).

Furthermore, the PABX ring in accordance with the invention can, compared with the present art, provide a saving in cost for control units with associated equipment by resource sharing. At present, the terminal has a fixed connection to its related control unit. Typically, a control unit can handle about 30 terminals. From the aspect of capacity, the control unit is dimensioned for this number, which makes it over-dimensioned in most operational situations where only some of the terminals are active. Since the PABX loop can provide an optional number of terminals with access to a control unit via a single interface in it, the number of terminals working with one control unit is determined by the number of active terminals, instead of by the number of terminals having a physical access possibility. In larger configurations, the number of control units may be further reduced by having a number of them forming together a common terminal pool. This resource sharing possibility is further reinforced in a distributed PABX solution where a common control unit pool can serve an area having a large geographic extension.

BRIEF DESCRIPTION OF DRAWING

The method and apparatus in accordance with the invention will next be described in detail with reference to the accompanying drawing, in which.

DETAILED DESCRIPTION

Figure 1:
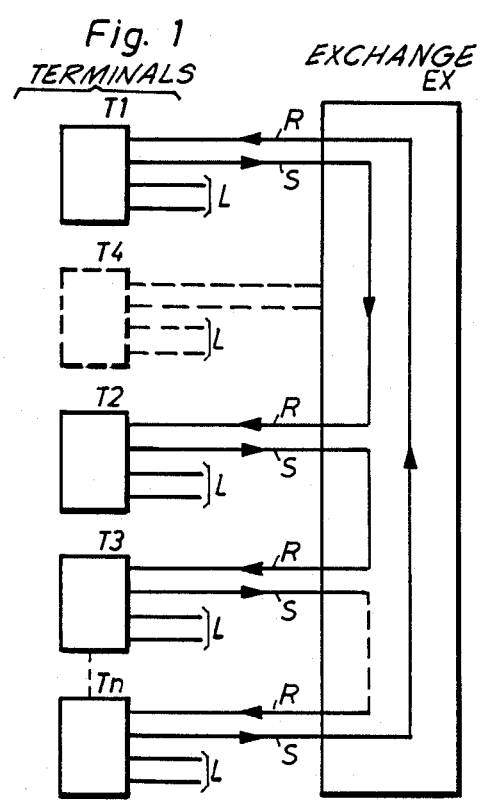
FIG. 1 is a block diagram of an apparatus provided in accordance with the invention.

As will be seen from FIG. 1, a plurality of terminals Tn are connected to an exchange (EX). The terminals, which may be telephone sets, display units, computer, etc; are each provided with at least one send channel (S) and one receiver channel (R).

Let it now be assumed that a terminal T1 desires contact with a terminal T2. According to the known art, the send output of terminal T1 should now then be connected to the receive input of terminal T2 and the send output of terminal T2 should be connected directly back to the receive input of terminal T1.

Figure 2:
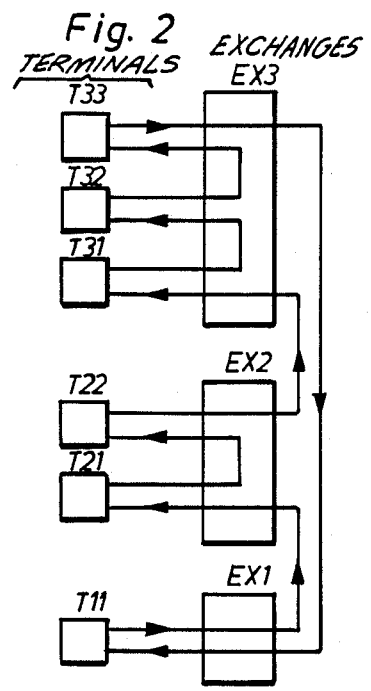
FIG. 2 illustrates in the form of a block diagram how a plurality of geographically separated terminal groups can be connected to a ring or loop.

This does not take place in accordance with the invention, but the send channel in terminal T1 is connected to the receive channel in terminal T2 instead, the send channel of terminal T2 being connected to the receiver in terminal T3. The send channel in terminal T3 is then connected to the receive channel in the next terminal and so on, up to the receive channel in terminal Tn, the send channel of which is finally connected to the receive channel in said first terminal T1. A closed loop (ring) is thus obtained, through which speech and data can be exchanged between arbitrarily selected terminals connected to the ring. The ring is established by the exchange (EX) in a way described below. The terminal Tn in FIG. 1 can be envisaged as symbolizing a computer or control unit with which the terminals work. Several such units can be included in the ring. FIG. 2 shows how three geographically separated exchanges, each with its associated terminal group, are connected to the ring in a way such that each of the terminals on connection into the ring understand it as a single ring, irrespective of whether more than one exchange or exchange module is utilized.

There is also the possibility of connecting further exchanges at a higher level, to the ring as well as the possibility of connecting several rings via bridges so that they are understood by the connected terminals as being one unbroken ring.

Figure 3:
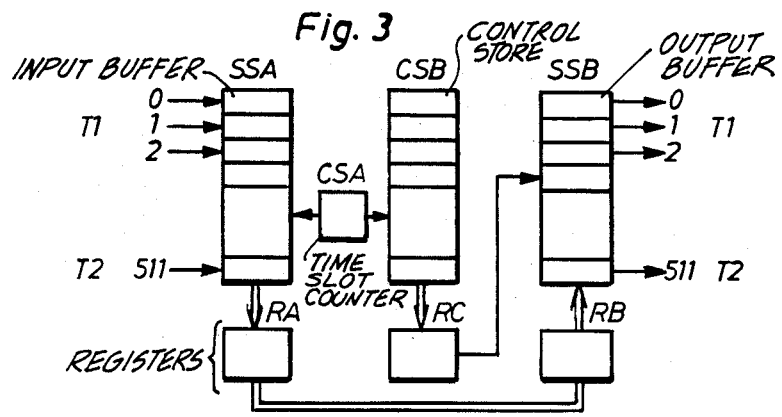
FIG. 3 illustrates in the form of a block diagram how the establishment of the loop is carried out in an exchange.

FIG. 3 schematically illustrates an apparatus in the exchange for setting up such loops for the establishment of a ring. In this embodiment, there is illustrated as an example a time switch without a space switching step, but the principle can, of course, be applied to any type of exchange at all. The apparatus includes an input buffer SSA, to the data outputs of which are connected an output register RA. The outputs from the register RA are connected to an input register RB having its outputs connected to an output buffer SSB. A control store CSB sends pointing signals to the output buffer via an output register RC. A time slot counter CSA determines the times for reading out from the stores SSA and CSB respectively. The entire apparatus is time-controlled conventionally by a clock signal unit (not shown). FIG. 3 thus shows an input buffer SSA in a PABX for speech and data. The buffer consists of a store with a plurality memory cells, e.g. 512, each of stores information corresponding to a time slot in a time multiplex system. Writing into the store takes place from the two-way lines (time slots) 0–511 connected to the store. Data is read out from the store SSA via the register RA to the register RB under control of the time slot counter CSA at a rate such that the contents of the store SSA is emptied at the same rate as it is filled from the lines. If the speed on the lines is 64 kbits/s and the word length in each memory position in the store SSA is 8 bits, then each cell of the store is read 64000/8 = 8000 times per second. The control store CSB contains just as many memory positions as the store SSA, i.e. 512.

In setting up a ring with the aid of the exchange, loading of the control store CSB takes place first from a control computer (not shown). Loading the control store defines the ring, i.e. determines which outputs and inputs are to be connected in order to obtain a ring. The send outputs of the terminals are scanned cyclically in given time slots. During each such time slot, the information, which is received in a corresponding position in the input buffer SSA since the previous scan, is shifted to the receiver input of the next terminal. This can mean for example that if the terminal T1 desires communication with terminal T2, the send output from T1 is connected to line 1 and is scanned during time slot 1. The receiver input to the terminal T2 can be connected to line 511, for example. In the control store CSB, there is written into position 1 the address of the receiving terminal, i.e. 511. The same thing applies when terminal T2 sends further to terminal T3. The send output from T2 is scanned during the time slot 511. If the receiver input to the terminal T3 is connected to line No. 200, then the address 200 is written into position No. 511 in the control store CSB. By writing the receiver's address into the control memory in a position corresponding to the send address, it is possible to determine how the ring will be formed by loading the store. It is also simple to connect new terminals to the ring by writing into the store. When a terminal no longer desires connection to the ring, the corresponding information is erased from the store. Since the method of writing into and reading out of the store is conventional, it is not more fully described here. By the ring being set up beforehand via the exchange, an all-to-all communication can very easily be obtained. When a terminal desires to send to another terminal, no further exterior activation of the exchange needs to take place, since all terminals are directly connected to the ring. The receiver is addressed in the information sent. Setting up the ring can for example be initiated from a centrally located terminal to the exchange, then exchange the obtaining information as to what terminals connected to it will participate in the ring. The communication proceedures for exchanging information on the ring are known, and are therefore not described. As will be seen further from FIG. 3, the time slot counter CSA also controls pointing and reading out of address information from the control store CSB, this information, after being read out from the store via the register RC, being used as a pointer for pointing out a memory position in the output buffer SSB which position is determined by the address. Such, buffer consists of a store containing 512 memory cells, each of which stores information corresponding to the content in a time slot. In pointing out from the control store CSB a position in the buffer store SSB, there is written into the buffer store the information from the input register RB in the position pointed out, and the information is read out to the connected line. Input lines to the store SSA and output lines from the store SSB are numbered to indicate 0–511 in the drawing.

Setting up a synchronous loop between the terminals T1, T2 and T3 thus takes place by writing T2 in the position T1 in the CSB, T3 in position T2 and T1 in position T3. If a further line terminal T4 (see FIG. 1) is to be added to the loop, e.g. between T1 and T2, T4 is written into position T1, and T2 into position T4 in the CSB. If it is later desired to remove the terminal T3 from the loop, T1 is written into the CSB and position T3 is erased.

If each line has several channels, e.g. according to proposals to ISDN, the channels can be connected, mutually independently, either in a loop or in a two-way connection by each channel being connected via separate equipment.

As the information is transferred between terminals and exchange in time multiplex form, a first terminal can carry on a normal two-way call with a second terminal, and this first terminal can simultaneously be connected to the ring for exchanging data information with a third terminal, all over the same connection but in different time slots. If the information is transferred in a system which is not time multiplexed, a separate pair of lines L may be utilized for speech information.

As previously mentioned, a terminal connected to the ring can work with different types and makes of computer without the need of physical action on the ring. Only an adjustment of the communication proceedures corresponding to the right computer equipment is necessary. In relation to the known art, this makes the solution in accordance with the invention extremely advantageous as fas as cost is concerned.

A system in accordance with the invention is furthermore well suited for utilization in a future integrated services digital network, (ISDN) for example.

What is claimed is:

1. In the utilization of a digital telecommunication system including an exchange including connecting circuits adapted for being controlled by signals, and a plurality of terminals including at least three terminals, each of said terminals including a send channel and a receive channel, a method of connecting the terminals in a closed loop so that any pair of terminals can communicate comprising the steps of physically connecting the channels of each terminal to the exchange, and establishing communication between any pair of said terminals by coupling all of the terminals in series in a closed loop such that the pair of terminals communicate with each other through intervening of said terminals in said loop, said establishing communication being effected by connecting the send channel of each of the terminals to the receive channel of the next sequential of the terminals in said loop by controlling the connecting circuits of the exchange to connect the same until said closed loop is formed, transmitting from each terminal of the pair to the other terminal of the pair through said loop, and adding a further terminal to said loop by physically connecting the further terminal to the exchange and, within the exchange, signalling the connecting circuits to connect the send and receive channels of the further terminal respectively to the receive and send channels of two other terminals in the loop so as to include the further terminal in the loop.

2. The method of claim 1 comprising in addition to the loop, providing speech channels between the terminals and the exchange, and transmitting speech signals via the speech channels and transmitting data via the loop.

3. The method of claim 1 further comprising the steps of providing other terminals connected to another exchange in the form of another loop and interconnecting the terminals and exchanges to provide a combined loop.

4. In a digital telecommunication system including a plurality of terminals each including a send channel and a receive channel, and an exchange including connecting circuits adapted for being controlled by signals connecting the channels to form a closed loop, the improvement whereby said exchange comprises: an input buffer means including a plurality of addressed registers each including an input connected to the send channel of a different terminal for receiving information signals therefrom, an addressing means for selecting an address register and an output register for receiving signals from the thusly selected addressed registers; an output buffer means including an input register, a plurality of addressed registers each including an output connected to the receive channel of a terminal for transmitting information thereto, and an addressing means for selecting an addressed register, each of said addressed registers accepting information signals stored in said input register when selected; bus means connecting said output register to said input register; a control store means including a plurality of addressed registers for storing addresses of the addressed registers of said output buffer means, an addressing means for selecting an addressed register, and an output register for receiving signals from the thusly selected addressed registers; and means for connecting the output register of said control store means to the addressing means of said output buffer means; counter means sequentially generating addresses; and means for connecting said counter means in parallel to the addressing means of said input buffer means and the addressing means of said control store whereby information read from an addressed register of said input buffer means is transmitted to the addressed register of said output buffer means specified by the address being simultaneously read from the addressed register of said control store means having the same corresponding address of the selected addressed register of said input buffer means.

5. The improvement of claim 4 further comprising a plurality of line pair means for two-way voice communication, each of said line pair means connecting a different one of said terminals to said exchange.

* * * * *